US012640584B2

(12) United States Patent
Zhang et al.

(10) Patent No.: US 12,640,584 B2
(45) Date of Patent: May 26, 2026

(54) BATTERY MANAGEMENT CONTROL SYSTEM OF FLOW BATTERY

(71) Applicant: VRB Energy Inc., Grand Cayman (KY)

(72) Inventors: HongLiang Zhang, Beijing (CN); Zhanzhan Zhang, Beijing (CN); Yongjun Yuan, Beijing (CN); Jian Wang, Beijing (CN); Mianyan Huang, Beijing (CN)

(73) Assignee: VRB Energy Inc., Grand Cayman (KY)

( * ) Notice: Subject to any disclaimer, the term of this patent is extended or adjusted under 35 U.S.C. 154(b) by 37 days.

(21) Appl. No.: 18/933,177

(22) Filed: Oct. 31, 2024

(65) Prior Publication Data

US 2025/0211021 A1      Jun. 26, 2025

Related U.S. Application Data

(63) Continuation of application No. 18/171,855, filed on Feb. 21, 2023, now abandoned.

(30) Foreign Application Priority Data

Feb. 21, 2022    (CN) ......................... 202220350358.7

(51) Int. Cl.
*H02J 9/06* (2006.01)
*H01M 8/04537* (2016.01)
(Continued)

(52) U.S. Cl.
CPC ......... *H02J 9/062* (2013.01); *H01M 8/04559* (2013.01); *H01M 8/04955* (2013.01); *H01M 8/188* (2013.01); *H01M 8/2465* (2013.01)

(58) Field of Classification Search
CPC ............... H02J 9/062; H01M 8/04559; H01M 8/04955; H01M 8/188; H01M 8/2465
(Continued)

(56) References Cited

U.S. PATENT DOCUMENTS

| 3,279,949 A | 10/1966 | Schaefer et al. |
| 3,530,003 A | 9/1970 | Warszawski et al. |

(Continued)

FOREIGN PATENT DOCUMENTS

| AT | 509888 A4 | 12/2011 |
| AU | 5556286 A | 8/1987 |

(Continued)

OTHER PUBLICATIONS

Notice of Allowance dated Apr. 24, 2024 for U.S. Appl. No. 18/171,855.

(Continued)

*Primary Examiner* — Hal Kaplan
(74) *Attorney, Agent, or Firm* — Dorsey & Whitney LLP

(57) ABSTRACT

The present application relates to a battery management and control system for a flow battery. An example battery management and control system includes an alternating current distribution box, a rectifying and inverting device, a flow battery including a battery pack that outputs direct current power, a positive electrode pump driver, and a negative electrode pump driver. The rectifying and inverting device connected to the battery pack inverts the direct current power into alternating current power and outputs the alternating current power. The alternating current distribution box is connected respectively to a power grid, the rectifying and inverting device, the positive electrode pump driver and the negative electrode pump driver. The box continuously supplies alternating current power to at least one of the positive electrode pump driver, the negative (Continued)

electrode pump driver or an additional system from either the power grid or the rectifying and inverting device.

23 Claims, 2 Drawing Sheets

(51) Int. Cl.
    *H01M 8/04955*     (2016.01)
    *H01M 8/18*     (2006.01)
    *H01M 8/2465*     (2016.01)

(58) Field of Classification Search
    USPC ........................................................ 307/66
    See application file for complete search history.

(56) References Cited

U.S. PATENT DOCUMENTS

| | | |
|---|---|---|
| 3,666,561 A | 5/1972 | Chiku |
| 3,996,064 A | 12/1976 | Thaller |
| 4,018,508 A | 4/1977 | Mcdermott et al. |
| 4,181,777 A | 1/1980 | Nidola et al. |
| 4,287,465 A | 9/1981 | Godard et al. |
| 4,312,735 A | 1/1982 | Grimes et al. |
| 4,362,791 A | 12/1982 | Kaneko et al. |
| 4,371,433 A | 2/1983 | Balko et al. |
| 4,410,606 A | 10/1983 | Loutfy et al. |
| 4,786,567 A | 11/1988 | Skyllas-Kazacos et al. |
| 4,797,566 A | 1/1989 | Nozaki et al. |
| 4,908,281 A | 3/1990 | Ocallaghan |
| 4,927,509 A | 5/1990 | Mathur et al. |
| 4,956,244 A | 9/1990 | Shimizu et al. |
| 5,225,712 A | 7/1993 | Erdman |
| 5,250,158 A | 10/1993 | Kaneko et al. |
| 5,308,718 A | 5/1994 | Eidler et al. |
| 5,318,865 A | 6/1994 | Kaneko et al. |
| 5,368,762 A | 11/1994 | Sato et al. |
| 5,484,666 A | 1/1996 | Gibb et al. |
| 5,486,430 A | 1/1996 | Gorbell et al. |
| 5,512,787 A | 4/1996 | Dederick |
| 5,587,132 A | 12/1996 | Nakajima et al. |
| 5,601,943 A | 2/1997 | Eidler et al. |
| 5,656,390 A | 8/1997 | Kageyama et al. |
| 5,665,212 A | 9/1997 | Zhong et al. |
| 5,725,967 A | 3/1998 | Tuttle |
| 5,734,255 A | 3/1998 | Thompson et al. |
| 5,759,711 A | 6/1998 | Miyabayashi et al. |
| 5,851,694 A | 12/1998 | Miyabayashi et al. |
| 6,086,643 A | 7/2000 | Clark et al. |
| 6,143,443 A | 11/2000 | Kazacos et al. |
| 6,219,623 B1 | 4/2001 | Wills |
| 6,239,508 B1 | 5/2001 | Faris et al. |
| 6,242,125 B1 | 6/2001 | Eidler et al. |
| 6,261,714 B1 | 7/2001 | Eidler et al. |
| 6,414,653 B1 | 7/2002 | Kobayashi |
| 6,416,653 B1 | 7/2002 | Barben et al. |
| 6,461,772 B1 | 10/2002 | Miyake et al. |
| 6,468,688 B2 | 10/2002 | Kazacos et al. |
| 6,475,661 B1 | 11/2002 | Pellegri et al. |
| 6,519,041 B1 | 2/2003 | Berthold |
| 6,524,452 B1 | 2/2003 | Clark et al. |
| 6,544,679 B1 | 4/2003 | Petillo et al. |
| 6,555,267 B1 | 4/2003 | Broman et al. |
| 6,558,833 B2 | 5/2003 | Mccoy |
| 6,562,514 B1 | 5/2003 | Kazacos et al. |
| 6,563,234 B2 | 5/2003 | Hasegawa et al. |
| 6,609,081 B1 | 8/2003 | De et al. |
| 6,613,298 B2 | 9/2003 | Tanaka et al. |
| 6,670,721 B2 | 12/2003 | Lof et al. |
| 6,680,547 B1 | 1/2004 | Dailey |
| 6,761,945 B1 | 7/2004 | Adachi et al. |
| 6,764,789 B1 | 7/2004 | Sekiguchi et al. |
| 6,809,431 B1 | 10/2004 | Schippmann |
| 6,858,953 B2 | 2/2005 | Stahlkopf |
| 6,875,535 B2 | 4/2005 | Ye et al. |
| 6,916,579 B2 | 7/2005 | Gorchkov et al. |
| 7,052,796 B2 | 5/2006 | Sabin et al. |
| 7,061,205 B2 | 6/2006 | Shigematsu et al. |
| 7,078,123 B2 | 7/2006 | Kazacos et al. |
| 7,083,875 B2 | 8/2006 | Lillis et al. |
| 7,181,183 B1 | 2/2007 | Hennessy |
| 7,184,903 B1 | 2/2007 | Williams et al. |
| 7,199,550 B2 | 4/2007 | Tsutsui et al. |
| 7,220,515 B2 | 5/2007 | Ito et al. |
| 7,227,275 B2 | 6/2007 | Hennessy et al. |
| 7,258,947 B2 | 8/2007 | Kubata et al. |
| 7,265,456 B2 | 9/2007 | Hennessy |
| 7,353,083 B2 | 4/2008 | Hennessy |
| 7,361,427 B1 | 4/2008 | Dow et al. |
| 7,389,189 B2 | 6/2008 | Williams et al. |
| 7,517,608 B2 | 4/2009 | Brereton et al. |
| 7,682,728 B2 | 3/2010 | Harper |
| 7,687,193 B2 | 3/2010 | Harper |
| 7,704,634 B2 | 4/2010 | Deguchi et al. |
| 7,740,977 B2 | 6/2010 | Lepp et al. |
| 8,026,013 B2 | 9/2011 | Valensa et al. |
| 8,048,555 B2 | 11/2011 | Darcy et al. |
| 8,277,964 B2 | 10/2012 | Hennessy |
| 8,541,138 B2 | 9/2013 | Kazacos et al. |
| 9,093,845 B2 | 7/2015 | Triebel et al. |
| 9,853,454 B2 | 12/2017 | Hennessy |
| 10,141,594 B2 | 11/2018 | Blacker et al. |
| 10,923,754 B2 | 2/2021 | Huang et al. |
| 2001/0028977 A1 | 10/2001 | Kazacos et al. |
| 2003/0087156 A1 | 5/2003 | Broman et al. |
| 2003/0143456 A1 | 7/2003 | Kazacos et al. |
| 2004/0036360 A1 | 2/2004 | Mccombs |
| 2004/0044442 A1 | 3/2004 | Bayoumi et al. |
| 2004/0113431 A1 | 6/2004 | Huang |
| 2004/0121204 A1 | 6/2004 | Adelman et al. |
| 2004/0151953 A1 | 8/2004 | Kirk et al. |
| 2004/0158417 A1 | 8/2004 | Bonet |
| 2004/0169493 A1 | 9/2004 | Tsutsui et al. |
| 2004/0172943 A1 | 9/2004 | Buelow et al. |
| 2004/0191623 A1 | 9/2004 | Kubata et al. |
| 2004/0207207 A1 | 10/2004 | Stahlkopf |
| 2004/0241544 A1 | 12/2004 | Nakaishi et al. |
| 2005/0004716 A1 | 1/2005 | Lillis et al. |
| 2005/0012395 A1 | 1/2005 | Eckroad et al. |
| 2005/0074665 A1 | 4/2005 | Spaziante et al. |
| 2005/0077252 A1 | 4/2005 | Shih et al. |
| 2005/0147871 A1 | 7/2005 | Shigematsu et al. |
| 2005/0156431 A1 | 7/2005 | Hennessy |
| 2005/0156432 A1 | 7/2005 | Hennessy |
| 2005/0158614 A1 | 7/2005 | Hennessy |
| 2005/0158615 A1 | 7/2005 | Samuel et al. |
| 2006/0142899 A1 | 6/2006 | Wobben |
| 2006/0171086 A1 | 8/2006 | Hennessy et al. |
| 2006/0273595 A1 | 12/2006 | Avagliano et al. |
| 2007/0001461 A1 | 1/2007 | Hopewell |
| 2007/0035135 A1 | 2/2007 | Yoshida |
| 2007/0072067 A1 | 3/2007 | Symons et al. |
| 2007/0202385 A1 | 8/2007 | Minamiura et al. |
| 2007/0219755 A1 | 9/2007 | Williams et al. |
| 2007/0258784 A1 | 11/2007 | Looker |
| 2008/0081247 A1 | 4/2008 | Nakaishi et al. |
| 2008/0182157 A1 | 7/2008 | Visco et al. |
| 2008/0220318 A1 | 9/2008 | Brereton et al. |
| 2008/0241643 A1 | 10/2008 | Lepp et al. |
| 2009/0004536 A1 | 1/2009 | Knauer et al. |
| 2009/0047570 A1 | 2/2009 | Harper |
| 2009/0047571 A1 | 2/2009 | Harper |
| 2009/0311559 A1 | 12/2009 | Levine et al. |
| 2010/0003545 A1 | 1/2010 | Horne et al. |
| 2010/0003586 A1 | 1/2010 | Sahu |
| 2010/0021805 A1 | 1/2010 | Winter |
| 2010/0136455 A1 | 6/2010 | Winter |
| 2011/0074357 A1 | 3/2011 | Parakulam et al. |
| 2011/0115425 A1 | 5/2011 | Olsson |
| 2011/0136016 A1 | 6/2011 | Huang et al. |
| 2011/0215645 A1 | 9/2011 | Schomburg et al. |
| 2011/0300417 A1 | 12/2011 | Mou et al. |
| 2011/0311896 A1 | 12/2011 | Harper et al. |
| 2012/0164498 A1 | 6/2012 | Mncent et al. |

(56) References Cited

U.S. PATENT DOCUMENTS

| | | | |
|---|---|---|---|
| 2012/0217933 A1 | 8/2012 | Abe et al. |
| 2012/0328911 A1 | 12/2012 | Hennessy |
| 2013/0089767 A1 | 4/2013 | Blacker et al. |
| 2013/0127396 A1 | 5/2013 | Triebel et al. |
| 2013/0154364 A1 | 6/2013 | Hennessy |
| 2013/0295487 A1 | 11/2013 | Huang et al. |

FOREIGN PATENT DOCUMENTS

| | | |
|---|---|---|
| AU | 8586291 A | 4/1992 |
| CN | 206673709 U | 11/2017 |
| CN | 206758557 U | 12/2017 |
| CN | 206758558 U | 12/2017 |
| CN | 206758562 U | 12/2017 |
| CN | 206758563 U | 12/2017 |
| CN | 206878104 U | 1/2018 |
| CN | 207759257 U | 8/2018 |
| CN | 207765538 U | 8/2018 |
| CN | 207765547 U | 8/2018 |
| CN | 207765549 U | 8/2018 |
| CN | 207765551 U | 8/2018 |
| CN | 207765552 U | 8/2018 |
| CN | 207765752 U | 8/2018 |
| CN | 207925586 U | 9/2018 |
| CN | 109309241 A | 2/2019 |
| CN | 110065698 A | 7/2019 |
| CN | 110071303 A | 7/2019 |
| CN | 110071305 A | 7/2019 |
| CN | 110071310 A | 7/2019 |
| CN | 110071314 A | 7/2019 |
| CN | 110071319 A | 7/2019 |
| CN | 110071404 A | 7/2019 |
| CN | 110137554 A | 8/2019 |
| CN | 110148955 A | 8/2019 |
| CN | 110474067 A | 11/2019 |
| CN | 110620240 A | 12/2019 |
| CN | 110845849 A | 2/2020 |
| CN | 110854401 A | 2/2020 |
| CN | 210764128 U | 6/2020 |
| CN | 211905519 U | 11/2020 |
| CN | 112350388 A | 2/2021 |
| EP | 0246649 A1 | 11/1987 |
| EP | 0517217 A1 | 12/1992 |
| EP | 0566019 A1 | 10/1993 |
| EP | 0814527 A2 | 12/1997 |
| EP | 0889571 A2 | 1/1999 |
| EP | 1284513 A1 | 2/2003 |
| EP | 1385226 A1 | 1/2004 |
| EP | 1536506 A1 | 6/2005 |
| FR | 2034755 A1 | 12/1970 |
| GB | 2030349 A | 4/1980 |
| GB | 2085475 A | 4/1982 |
| JP | S54138502 A | 10/1979 |
| JP | S5642970 B2 | 4/1981 |
| JP | S579072 A | 1/1982 |
| JP | S579073 A | 1/1982 |
| JP | S60225366 A | 11/1985 |
| JP | S6369151 A | 3/1988 |
| JP | H0714617 B2 | 1/1995 |
| JP | H087913 B2 | 1/1996 |
| JP | H0819179 B2 | 1/1996 |
| JP | H09283169 A | 10/1997 |
| JP | H11299106 A | 10/1999 |
| JP | 2003317763 A | 11/2003 |
| JP | 2004319341 A | 11/2004 |
| JP | 2007153477 A | 6/2007 |
| JP | 2007192776 A | 8/2007 |
| JP | 2009283169 A | 12/2009 |
| WO | 1989005363 | 6/1989 |
| WO | 1989005528 | 6/1989 |
| WO | 1990003665 | 4/1990 |
| WO | 1995012219 | 5/1995 |
| WO | 1999039397 | 8/1999 |
| WO | 1999050945 | 10/1999 |
| WO | 2003092109 | 11/2003 |
| WO | 2004054065 A1 | 6/2004 |
| WO | 2006081514 A2 | 8/2006 |
| WO | 2006089415 A1 | 8/2006 |
| WO | 2006129635 A1 | 12/2006 |
| WO | 2008053317 A1 | 5/2008 |
| WO | 2010118060 A1 | 10/2010 |
| WO | 2011074330 A1 | 6/2011 |
| WO | 2011114094 A1 | 9/2011 |
| WO | 2011154306 A2 | 12/2011 |

OTHER PUBLICATIONS

Notice of Allowance dated Aug. 2, 2024 for U.S. Appl. No. 18/171,855.

"6001 Chemical Abstract", 111:198495s, Feb. 6, 2012, 2 pgs.

"Definition of "Electrical Power"", Retrieved for Dictionary.com, Aug. 12, 2010.

"Definition of "Load"", Retrieved for Dictionary.com, Aug. 12, 2010.

"Flow Battery", Flow Battery Solutions, http://www.arbin.com/products/flow-battery?gclid=CKvNqLXD7bUCFed1Ogod-jcAkQ>, Mar. 15, 2013, 4 pgs.

"Premium Power Corporation", North Andover, Massachusetts, United States, Powerblock 150 Specification, 2 pgs.

"Premium Power Corporation, North Andover, Massachusetts, United States, Product Brochure", Zinc-Flow 45 Regenerative Fuel Cell with DC Output Power, for Uninterrupted Operation of Mission-Critical Site Infrastructure, 2 pgs.

"Premium Power Corporation, North Andover, Massachusetts, United States, Product Brochure", TransFlow 2000, Utility-Scale Mobile Energy Storage System, http://www.premium/umpower.com/product/TF2000_2-pager.pdf, 2000, 2 pgs.

Bartolozzi , "Development of Redox Flow Batteries. A Historical Bibliography", Journal of Power Sources, 27, 1989, 219-234.

Barton , et al., "Energy Storage and its Use with Intermittent Renewable Energy", IEEE Transactions on Energy Conversion, vol. 19 No. 2, Jun. 2004, 8 pgs.

Chen , et al., "Solution Redox Couples for Electrochemical Energy Storage", Journal of Electrochemical Society Energy Storage (128), Feb. 6, 2012, 1460-1467.

Chen , et al., "Solution Redox Couples for Electrochemical Energy Storage", Journal of Electrochemical Society Energy Storage (1982), 129(1), Feb. 6, 2012, 61-66.

Close , "Energy Storage—A Key Technology for Global Energy Sustainability", Journal of Power Sources 100, 2-17, 2001, 16 pgs.

Hagedorn , et al., "NASA Redox Cell Stack Shunt Current, Pumping Power, and Cell Performance Tradeoffs", National Aeronautics and Space Administration, Lewis research Center, Feb. 1982, 30 pgs.

Hawkins , et al., "A Field Trial of a Vanadium Energy Storage System", INTELC 2001, Conference Publication No. 484, Oct. 2001, 652-656.

Kazacos , "Electrolyte Optimization and Electrode Material Evaluation for the Vanadium Redox Battery", A thesis submitted as part of the requirements for the degree of Master of Science, School of Chemical Engineering and Industrial Chemistry, The University of New South Wales, Feb. 1989, 252 pgs.

Kazacos , et al., "Vanadium Redox Cell Electrolyte Optimization Studies", Journal of Applied Electrochemistry, 20, 1990, 463-467.

Liu , et al., "Enhancing Performance of the Ti(III/Ti(IV) Couple for Redox Battery Applications", Journal of Electrochemical Society, downloaded Feb. 6, 2021, 1981, 1755-1757.

Murthy , et al., "Fe(III)/FE(II)—Ligand Systems for Use as Negative Half-Cells in Redox-Flow Cells", Journal of Power Sources, 27(2), 1989, 119-126.

Nevins , et al., Article Entitled, "Flow Battery Solution for Smart Grid Renewable Energy Applications", Ktech Corporation, DOE Energy Storage Program Review, Nov. 10, 2010, 14 pgs.

Nguyen , et al., "Flow Batteries", The Electrochemical Society Interface, Fall 2010, 3 pgs.

Norris , et al., "Grid-Connected Solar Energy Storage Using the Zinc-Bromine Flow Battery", 4 pgs.

(56) References Cited

OTHER PUBLICATIONS

Ponce De Leon , et al., "Redox Flow Cells for Energy Conversion", Elsevier B.V. ScienceDirect, Journal of Power Sources 160, 2006, 716-732.

Scamman , et al., "Numerical Modeling of a Bromide-Polysulphide Redox Flow Battery Part 1: Modelling Approach and Validation for a Pilot-Scale System", Elsevier B.V. Journal of Power Sources 189, 2009, 1120-1230.

Shigematsu , et al., "Applications of a Vanadium Redox-Flow Battery to Maintain Power Quality", Sumitomo Electric Industries, Ltd. IEEE, 2002, 6 pgs.

Skyllas-Kazacos , et al., "Characteristics and Performance of 1KW Unsw Vanadium Redox Battery", Journal of Power Sources, 35, 1991, 399-404.

Skyllas-Kazacos , et al., "Development of Redox Cell for Remote Area Energy Storage", School of Chemical Engineering & Industrial Chemistry, University of New South Wales, 200 pgs.

Skyllas-Kazacos , et al., "Vanadium Redox Battery Prototype: Design & Development", University of New South Wales, Department of Minerals and Energy, Jan. 1991, 256 pgs.

Sum , et al., "A Sturdy of the V(II)/V(III) Redox Couple for Redox Flow Cell Applications", Journal of Power Sources, 15, 1985, 179-190.

Tokuda , et al., "Development of a Redox Flow Battery System", SEI Technical Review, No. 50, Jun. 2000, 4 pgs.

ZBB Energy Corporation , "The Focus of Advanced Energy Storage Systems", Menomonee Falls, Wisconsin, United States, Production Brochure, http://www.zbbenergy.com/pdf/ZBB_CprtBrochure_Web/pd, 8 pgs.

BATTERY MANAGEMENT CONTROL SYSTEM OF FLOW BATTERY

RELATED APPLICATIONS

This application is a continuation of U.S. patent application Ser. No. 18/171,855, filed on Feb. 21, 2023, titled BATTERY MANAGEMENT SYSTEM OF FLOW BATTERY, which claims priority to and the benefit of Chinese Patent Application No. 202220350358.7, filed on Feb. 21, 2022, the disclosure of each of which is expressly incorporated herein by reference in its entirety.

TECHNICAL FIELD

The present application relates to the field of flow batteries, and in particular to a battery management and control system for a flow battery.

BACKGROUND

Flow batteries are a new type of storage battery, which has the characteristics of high capacity and long life cycle. The flow battery comprises a battery pack, an electrolyte solution, and an electrolyte solution storage and supply unit. Among them, the electrolyte solution is divided into a positive electrode electrolyte solution and a negative electrode electrolyte solution.

It can be understood that a positive electrode pump and a negative electrode pump are provided in the flow battery. The positive electrode pump is used for pumping the positive electrode electrolyte solution to the battery pack, and the negative electrode pump is used for pumping the negative electrode electrolyte solution to a cell stack group. Driving the positive electrode pump and the negative electrode pump consumes a lot of power, and a battery management and control system externally connected to the flow battery is generally connected to a power grid for power supply. Of course, the battery management and control system may also supply power to other external systems.

Since the battery management and control system draws power from the power grid, once it is off the grid, the positive electrode pump driver and the negative electrode pump driver will not work normally, resulting in poor stability in the working process of the flow battery.

SUMMARY

In order to improve the stability of the working process of a flow battery, the present application provides a battery management and control system for the flow battery.

A battery management and control system for a flow battery provided by the present application adopts the following technical solution: a battery management and control system for a flow battery, comprising an alternating current distribution box, a rectifying and inverting device and a flow battery, wherein the flow battery includes a battery pack, a positive electrode pump driver and a negative electrode pump driver; the battery pack is used for storing and outputting direct current power; the rectifying and inverting device is connected to the battery pack, and is used for inverting the direct current power into alternating current power and outputting it; and the alternating current distribution box is separately connected to a power grid, the rectifying and inverting device, the positive electrode pump driver and the negative electrode pump driver, and is used for uninterrupted access to alternating current power and supplying power to the positive electrode pump driver, the negative electrode pump driver and an additional system.

By adopting the above technical solution, the positive electrode pump driver and the negative electrode pump driver can obtain power from the power grid, and can also obtain power from the battery pack. The alternating current distribution box can adjust the conduction of lines connected to the power grid and the battery pack, so that the battery pack is enabled for power supply when the power grid is powered off for maintenance, and the power grid is enabled for power supply when the power grid is restored. Of course, the power grid and the battery pack can also be simultaneously used for power supply. This enables the alternating current distribution box to uninterruptedly access the alternating current power, so as to continuously supply power to the positive electrode pump driver and the negative pump driver, which can improve the stability of the working process of the flow battery.

Optionally, the battery management and control system further includes a transformer, and the transformer is connected to a line connecting the rectifying and inverting device and the alternating current distribution box.

Optionally, the rectifying and inverting device is an energy storage converter.

Optionally, the rectifying and inverting device is an uninterruptible power supply (UPS) with a grid-connected operation function, a rectifying function and an inverting function.

Optionally, the battery pack includes a plurality of cell stack groups, and each cell stack group includes a plurality of batteries connected in series; and a branch switch is provided on a line connecting every two connected batteries, each battery is connected to the rectifying and inverting device, and a line of each battery used for connection of the rectifying and inverting device is provided with an independent switch, so that each battery can supply power independently.

By adopting the above technical solution, each battery can provide independent power supply, so as to adjust the consistency of all batteries in the battery pack, which is more advantageous for the long-term stable power supply of the batteries.

Optionally, the battery management and control system further includes a voltage detection device and a controller. The battery pack may be further connected to the positive electrode pump driver and the negative electrode pump driver separately, and the voltage detection device is used for detecting a voltage of the battery pack, and outputting a voltage detection signal. The controller may be connected to the voltage detection device, and used for outputting an off signal when a voltage reflected by the voltage detection signal received is higher than a voltage threshold. A contact is further provided on a line where the battery pack is connected to the positive electrode pump driver and the negative electrode pump driver, and the contact is connected to the controller and used for being turned off when the off signal is received.

By adopting the above technical solution, the direct current power can supply power for the positive electrode pump driver and the negative electrode pump driver, and compared with the alternating current power, the inverter loss is reduced and the power supply efficiency is improved.

Optionally, the battery management and control system further includes a surge protector connected to an output end of the alternating current distribution box.

By adopting the above technical solution, the current backflow can be effectively prevented to protect the entire system.

Optionally, the battery management and control system further includes a surge protector connected to an output end of the alternating current distribution box.

In summary, the present application includes at least one of the following beneficial technical effects.

First, the alternating current distribution box can adjust the conduction of lines connected to the power grid and the battery pack, so that the battery pack is enabled for power supply when the power grid is powered off for maintenance, and the power grid is enabled for power supply when the power grid is restored. Of course, the power grid and the battery pack can also be simultaneously used for power supply. This enables the alternating current distribution box to uninterruptedly access the alternating current power, so as to continuously supply power to the positive electrode pump driver and the negative pump driver, which can improve the stability of the working process of the flow battery.

Second, by directly connecting the battery pack to the positive electrode pump driver and the negative electrode pump driver when the voltage of the battery pack is greater than the voltage threshold, the direct current power can be used to directly supply power to the positive electrode pump driver and the negative electrode pump driver, so as to reduce the inverter loss and improve the power supply efficiency.

DETAILED DESCRIPTION

In order to make the objectives, technical solutions and advantages of the present application clearer, the present application will be further described in detail below in conjunction with FIGS. 1-2 and embodiments. It should be understood that specific embodiments described herein are only used to explain the present application and are not intended to limit the present application.

Disclosed in the embodiments of the present application is a battery management and control system for a flow battery, which can automatically enable a battery pack of the flow battery to supply power to a positive electrode pump driver and a negative electrode pump driver of the flow battery when a power grid is powered off, so as to improve the stability of the working process of the flow battery.

Figure 1:
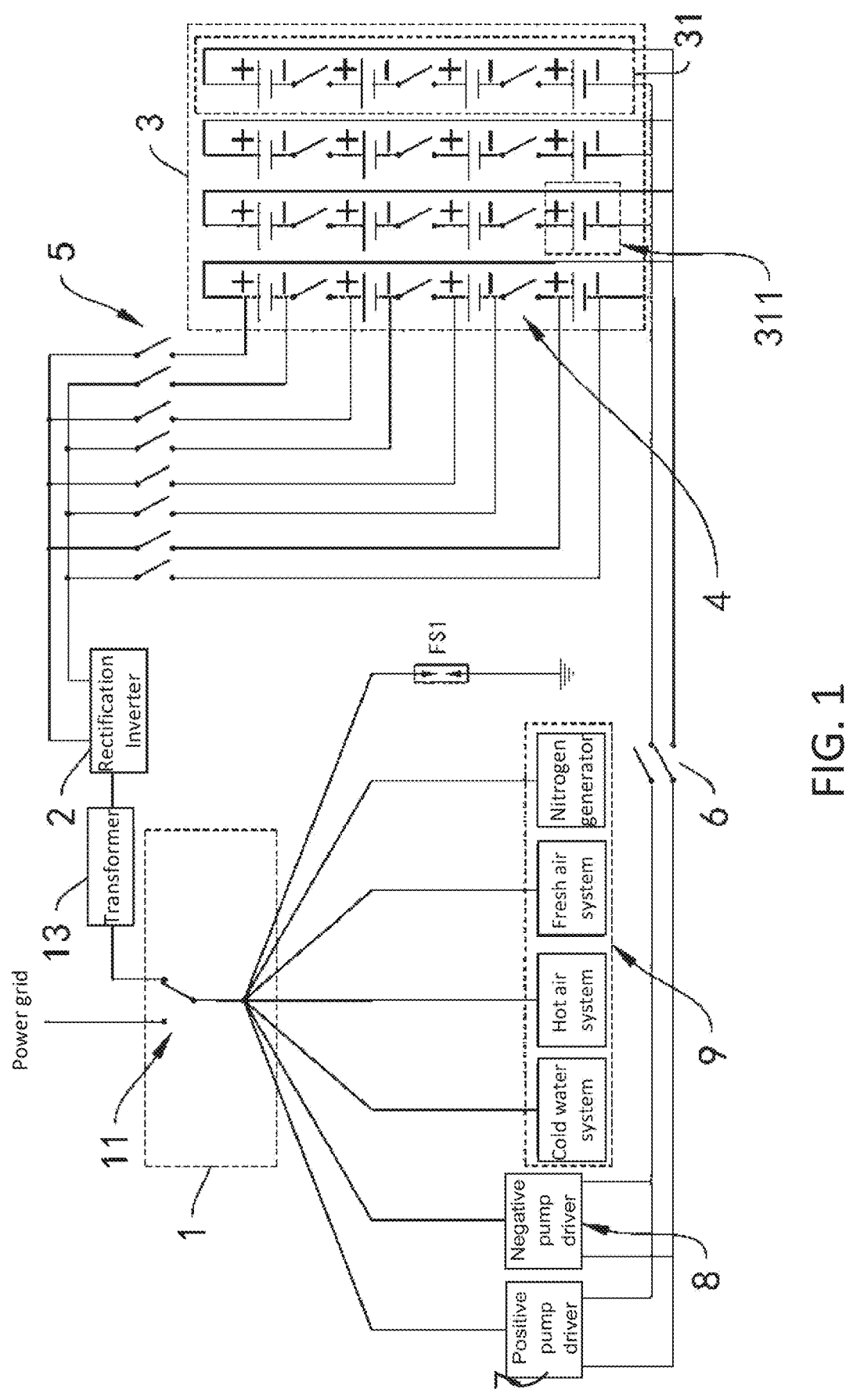
FIG. 1 is a schematic circuit diagram of a battery management and control system according to an embodiment of the present application.
Figure 2:
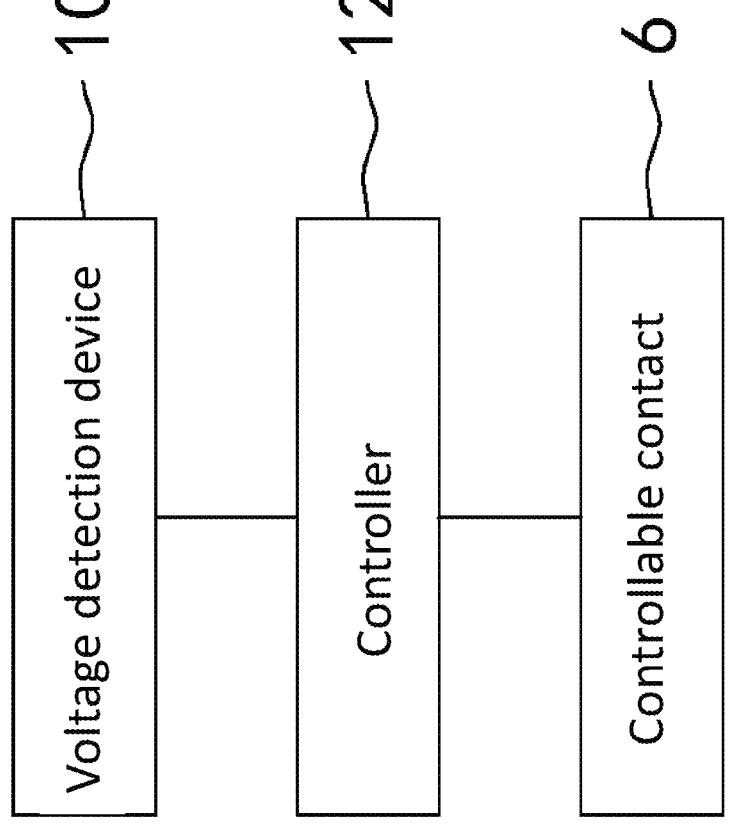
FIG. 2 is a system diagram of a battery management and control system according to an embodiment of the present application.

Referring to FIGS. 1 and 2, the battery management and control system of the flow battery comprises an alternating current distribution box 1, a rectifying and inverting device 2 and a flow battery, and the flow battery comprises a battery pack 3, a positive electrode pump, a positive electrode pump driver 7, a negative electrode pump and a negative electrode pump driver 8, wherein the positive electrode pump driver 7 is used for driving the positive electrode pump to operate, and the negative electrode pump driver 8 is used to drive the negative electrode pump to operate.

The alternating current distribution box 1 is separately connected to the positive electrode pump driver 7 and the negative electrode pump driver 8 for uninterrupted access to alternating current power and supplying power to the positive electrode pump driver 7 and the negative electrode pump driver 8.

Specifically, the alternating current distribution box 1 comprises two incoming lines and multiple outgoing lines, and a diverter switch 11 for controlling the conduction of the two incoming lines separately. Preferably, the diverter switch 11 is a single-pole double-throw switch, so as to realize selective conduction of the two incoming lines. Of course, two contacts controlled by a device with a control function such as a relay may also be selected and used, and the two contacts are provided on the two incoming lines, respectively.

One incoming line is connected to a power grid for accessing alternating current power from the power grid. The other incoming line is connected to the rectifying and inverting device 2 for accessing the alternating current power converted and output by the rectifying and inverting device 2.

The rectifying and inverting device 2 is connected to the battery pack 3, and is used for inverting direct current power output by the battery pack 3 into alternating current power and outputting it. In the present application, the rectifying and inverting device 2 is preferably an energy storage converter or a UPS. Among them, the UPS may have both a rectifying function and an inverting function, and can operate in a grid-connected state.

In order to make the alternating current power converted and output by the rectifying and inverting device 2 suitable for the voltage requirements of the positive electrode pump driver 7 and the negative electrode pump driver 8, a transformer 13 is provided on a line on which the rectifying and inverting device 2 is connected to the alternating current distribution box 1.

The battery pack 3 comprises a plurality of cell stack groups 31, and each cell stack group 31 comprises a plurality of batteries 311 connected in series. Generally, each cell stack group 31 is connected to the rectifying and inverting device 2, so as to supply power to the positive electrode pump driver 7 and the negative electrode pump driver 8 after the power grid is powered off.

It can be understood that each battery 311 may also be used as an independent power supply to provide direct current power. Specifically, a branch switch 4 is provided on a line connecting every two connected batteries 311, each battery 311 is connected to the rectifying and inverting device 2, and two independent switches 5 are provided on a line on which each battery 311 is connected to the rectifying and inverting device 2. When the two independent switches 5 connected to the same battery 311 are controlled to be turned on and the other switches are controlled to be turned off, the battery 311 connected to the two independent switches 5 is in communication with the rectifying and inverting device 2, and the battery 311 can output direct current power. By sequentially switching the two independent switches 5 connected to the same battery 311 to be turned on while other switches are turned off, each battery 311 can provide power supply independently, which is more advantageous for making the battery 311 have better consistency, so as to prolong the lifespan of the battery pack 3. It is worth noting that the battery 311 can also be charged through the rectifying function of the rectifying and inverting device, so that the battery 311 has better consistency.

It is worth noting that the positive electrode pump driver 7 and the negative electrode pump driver 8 can be driven by not only alternating current power but also direct current power. Compared with the alternating current driving mode, the direct current driving mode can reduce the inversion loss generated by the direct current power passing through the rectifying and inverting device 2, and has higher power supply efficiency.

Specifically, the battery pack 3 is connected to the positive electrode pump driver 7 and the negative electrode pump driver 8 separately. It needs to be noted that, although using the direct current power for direct power supply is a more preferable solution, this solution has certain application limitations, that is, the current voltage of the battery pack 3 needs to be higher than a voltage threshold.

Further, a controllable contact 6 is further provided on a line on which the battery pack 3 is connected to the positive electrode pump driver 7 and the negative electrode pump driver 8. The controllable contact 6 is used for closing when receiving a closing signal.

Specifically, the present application further comprises a voltage detection device 10 and a controller 12. The voltage detection device 10 is used for detecting the magnitude of the voltage of the battery pack 3 and outputting a voltage detection signal. A device with a function of measuring the magnitude of a voltage, such as a voltage sensor, may be selected and used as the voltage detection device 10.

The controller 12 is separately connected to the voltage detection device 10 and the controllable contact 6, and is used for receiving the voltage detection signal, and for outputting a closing signal when a voltage value reflected by the voltage detection signal is higher than a voltage threshold, so as to control the closing of the controllable contact 6. That is, when the power grid is in an off-grid state and the voltage of the battery pack 3 is higher than the voltage threshold, the controller 12 controls the controllable contact 6 to close. At this time, the battery pack 3 outputs direct current power to directly supply power to the positive electrode pump driver 7 and the negative electrode pump driver 8. On the contrary, the controllable contact 6 is still in a disconnected state, and the direct current power output by the battery pack 3 is inverted by the rectifying and inverting device 2 to supply power to the positive electrode pump driver 7 and the negative electrode pump driver 8. In this application, the voltage threshold is preferably 250 V. Of course, the voltage threshold may be adaptively adjusted according to actual needs.

In addition to being controlled by the controller 12 to be closed, the controllable contact 6 may also be manually closed by a worker.

However, it needs to be noted that since the voltage of a battery 311 is relatively low, it is not enough to independently drive the positive electrode pump driver 7 and the negative electrode pump driver 8 to operate. Therefore, when directly supplying power to the positive electrode pump driver 7 and the negative electrode pump driver 8, the entire battery pack 3 must be connected to the positive electrode pump driver 7 and the negative electrode pump driver 8.

For multiple outgoing lines of the alternating current distribution box 1, in addition to connecting the positive electrode pump driver 7 and the negative electrode pump driver 8, they are also used to connect an external additional system 9 for supplying power to it. The additional system 9 is at least one or more of a cold water system, a hot air system, a fresh air system and a nitrogen generator.

The battery management and control system of the present application further comprises a surge protector FS1. The surge protector FS1 is also connected to one outgoing line of the alternating current distribution box 1 to protect the system.

The implementation principle of a battery management and control system for a flow battery in the embodiments of the present application is as follows: by setting the alternating current distribution box 1 and the rectifying and inverting device 2, when the power grid is powered off, the alternating current distribution box 1 can access alternatively current power generated by inverting direct current power provided by the battery pack 3 through the rectifying and inverting device 2, so as to realize uninterrupted power supply to the positive electrode pump driver 7 and the negative electrode pump driver 8, thereby providing stability in the operating state of the flow battery.

All of the above are preferred embodiments of the present application, and are not intended to limit the scope of protection of the present application. Any feature disclosed in this specification (comprising the abstract and drawings) may be replaced by other equivalent or alternative features for similar purposes, unless specifically stated. That is, each feature is only one example of a series of equivalent or similar features, unless specifically stated.

The invention claimed is:

1. A battery management and control system comprising:
an alternating current distribution box;
a rectifying and inverting device;
a flow battery comprising:
    a battery pack coupled to the rectifying and inverting device and configured to store and output direct current power;
a positive electrode pump driver;
and a negative electrode pump driver,
wherein the rectifying and inverting device is configured to invert the direct current power from the battery pack into alternating current power and to output the alternating current power, and
wherein the alternating current distribution box is connected respectively to a power grid, the rectifying and inverting device, the positive electrode pump driver and the negative electrode pump driver, further configured to continuously supply alternating current power to at least one of the positive electrode pump driver, the negative electrode pump driver or an additional system from either the power grid or the rectifying and inverting device.

2. The battery management and control system according to claim 1, further comprising a transformer connected to a line that is connected to the rectifying and inverting device and the alternating current distribution box.

3. The battery management and control system according to claim 2, wherein the rectifying and inverting device is an energy storage converter.

4. The battery management and control system according to claim 2, wherein the rectifying and inverting device is an uninterruptible power supply (ups) with a grid-connected operation function, a rectifying function and an inverting function.

5. The battery management and control system according claim 3, wherein the battery pack comprises:
a plurality of cell stack groups, each cell stack group comprising a plurality of batteries connected in series;
a branch switch configured to connect adjacent batteries among the plurality of batteries; a line connected to a battery among the plurality of batteries; and
an independent switch connected to the line and configured to connect the line to the rectifying and inverting device.

6. The battery management and control system according to claim 5, further comprising:

a voltage detection device configured to detect a voltage of the battery pack, and to output a voltage detection signal;

a controller connected to the voltage detection device, and configured to output an off signal when a voltage reflected by the voltage detection signal is higher than a voltage threshold; and a controllable contact connected to the battery pack and further connected to the positive electrode pump driver and the negative electrode pump driver separately, wherein the controllable contact is connected to the controller, and configured to be turned off responsive to the off signal.

7. The battery management and control system according to claim 6, further comprising a surge protector connected to an output end of the alternating current distribution box.

8. The battery management and control system according to claim 7, wherein the additional system comprises at least one of a cold water system, a hot air system, a fresh air system or a nitrogen generator.

9. The battery management and control system according claim 1, wherein the battery pack comprises:

a plurality of cell stack groups, each cell stack group comprising a plurality of batteries connected in series;

a branch switch configured to connect adjacent batteries among the plurality of batteries;

a line connected to a battery among the plurality of batteries; and an independent switch connected to the line and configured to connect the line to the rectifying and inverting device.

10. The battery management and control system according to claim 1, further comprising:

a voltage detection device configured to detect a voltage of the battery pack, and to output a voltage detection signal;

a controller connected to the voltage detection device, and configured to output an off signal when a voltage reflected by the voltage detection signal is higher than a voltage threshold; and a controllable contact connected to the battery pack and further connected to the positive electrode pump driver and the negative electrode pump driver separately, wherein the controllable contact is connected to the controller, and configured to be turned off responsive to the off signal.

11. The battery management and control system according to claim 1, further comprising a surge protector connected to an output end of the alternating current distribution box.

12. The battery management and control system according to claim 1, wherein the additional system comprises at least one of a cold water system, a hot air system, a fresh air system, or a nitrogen generator.

13. The battery management and control system according to claim 1, wherein the alternating current distribution box comprises two incoming lines, multiple outgoing lines, and a diverter switch configured to separately control the two incoming lines.

14. The battery management and control system according to claim 13, wherein the diverter switch comprises a single-pole double-throw switch.

15. A battery management and control system comprising:

an alternating current distribution box;

a rectifying and inverting device, wherein the rectifying and inverting device is an uninterruptible power supply (ups) with a grid-connected operation function, a rectifying function and an inverting function;

a flow battery comprising a battery pack coupled to the rectifying and inverting device and configured to store and output direct current power;

a positive electrode pump driver;

and a negative electrode pump driver, wherein the rectifying and inverting device is configured to invert the direct current power from the battery pack into alternating current power and to output the alternating current power, and wherein the alternating current distribution box is configured to be connected respectively to a power grid, the rectifying and inverting device, the positive electrode pump driver and the negative electrode pump driver, further configured to continuously supply alternating current power to at least one of the positive electrode pump driver, the negative electrode pump driver or an additional system from either the power grid or the rectifying and inverting device.

16. A battery management and control system comprising:

an alternating current distribution box;

a rectifying and inverting device, wherein the rectifying and inverting device is an energy storage converter;

a flow battery comprising a battery pack coupled to the rectifying and inverting device and configured to store and output direct current power;

a positive electrode pump driver;

and a negative electrode pump driver, wherein the rectifying and inverting device is configured to invert the direct current power from the battery pack into alternating current power and to output the alternating current power, and wherein the alternating current distribution box is configured to be connected respectively to a power grid, the rectifying and inverting device, the positive electrode pump driver and the negative electrode pump driver, further configured to continuously supply alternating current power to at least one of the positive electrode pump driver, the negative electrode pump driver or an additional system from either the power grid or the rectifying and inverting device.

17. The battery management and control system according claim 16, wherein the battery pack comprises:

a plurality of cell stack groups, each cell stack group comprising a plurality of batteries connected in series;

a branch switch configured to connect adjacent batteries among the plurality of batteries;

a line connected to a battery among the plurality of batteries; and an independent switch connected to the line and configured to connect the line to the rectifying and inverting device.

18. The battery management and control system according to claim 16, further comprising:

a voltage detection device configured to detect a voltage of the battery pack, and to output a voltage detection signal;

a controller connected to the voltage detection device, and configured to output an off signal when a voltage reflected by the voltage detection signal is higher than a voltage threshold; and a controllable contact connected to the battery pack and further connected to the positive electrode pump driver and the negative electrode pump driver separately, wherein the controllable contact is connected to the controller, and configured to be turned off responsive to the off signal.

19. The battery management and control system according to claim 16, further comprising a surge protector connected to an output end of the alternating current distribution box.

20. The battery management and control system according to claim 16, wherein the alternating current distribution box comprises two incoming lines, multiple outgoing lines, and a diverter switch configured to separately control the two incoming lines, the diverter switch comprising a single-pole double-throw switch.

21. A method of controlling a battery system, comprising:
connecting an alternating current distribution box to a power grid and to a rectifying and inverting device;
connecting a flow battery to the rectifying and inverting device, wherein the flow battery comprises a battery pack configured to store and output direct current power,
wherein the rectifying and inverting device is configured to invert the direct current power from the battery pack into alternating current power and to output the alternating current power, and wherein the alternating current distribution box is configured to continuously supply alternating current power to at least one of a positive electrode pump driver, a negative electrode pump driver, or an additional system from either the power grid or the rectifying and inverting device.

22. The method of claim 21, wherein when the power grid is powered off, the alternating current distribution box accesses alternating current power generated by inverting direct current power provided by the battery pack through the rectifying and inverting device so as to realize uninterrupted power supply to the at least one of the positive electrode pump driver, the negative electrode pump driver, or the additional system.

23. The method of claim 21, further comprising:
connecting the battery pack to a positive electrode pump driver and a negative electrode pump driver, wherein the battery pack is configured to output direct current power to the positive electrode pump driver and the negative electrode pump driver when a voltage of the battery pack is higher than a voltage threshold.

* * * * *